United States Patent [19]
Rayburn et al.

[11] Patent Number: 5,971,067
[45] Date of Patent: Oct. 26, 1999

[54] AIR QUALITY CONTROL SYSTEM

[75] Inventors: Ronald R. Rayburn, Tyler, Tex.; Guy A. Deluca, Phoenix, Ariz.

[73] Assignee: Carrier Corporation, Syracuse, N.Y.

[21] Appl. No.: 08/601,725

[22] Filed: Feb. 15, 1996

[51] Int. Cl.⁶ ............................................. F24F 7/00
[52] U.S. Cl. ..................... 165/217; 165/248; 165/249; 165/250; 165/251; 236/49.3; 454/256
[58] Field of Search ..................... 165/248, 249, 165/250, 251, 217; 236/49.3; 454/256

[56] References Cited

U.S. PATENT DOCUMENTS

| | | | |
|---|---|---|---|
| 2,254,185 | 8/1941 | Newton | 165/216 |
| 4,210,278 | 7/1980 | Obler | 165/251 |
| 4,347,712 | 9/1982 | Benton et al. | 165/251 |
| 4,362,026 | 12/1982 | Miller | 165/251 |
| 4,389,853 | 6/1983 | Hile | 165/251 |
| 4,437,391 | 3/1984 | Eguchi et al. | 165/249 |
| 4,487,363 | 12/1984 | Parker et al. | 236/49 |
| 4,530,395 | 7/1985 | Parker et al. | 236/1 C |
| 4,732,318 | 3/1988 | Osheroff | 165/217 |
| 4,830,095 | 5/1989 | Friend | 165/217 |
| 4,931,948 | 6/1990 | Parker et al. | 165/217 |
| 5,257,736 | 11/1993 | Roy | 165/248 |
| 5,261,596 | 11/1993 | Tachibana et al. | 165/248 |
| 5,590,830 | 1/1997 | Kettler et al. | 165/251 |
| 5,626,288 | 5/1997 | Huber | 165/248 |

OTHER PUBLICATIONS

"Carrier Temp Comfort Systems 33CS" brochure dated 1995 Carrier Corporation.
"Carrier VVT Comfort Systems 33CS" brochure dated 1995 Carrier Corporation.
"Key Systems for Commercial Buildings" 33CDS–1PD Carrier Corporation 1986.

*Primary Examiner*—John K. Ford

[57] ABSTRACT

The present invention is a system for controlling the quality of air in a building. The system includes a sensor disposed for sensing the air quality in a building. Upon a sensing of an air quality problem, the system issues a command to draw in additional outside air into the building to alleviate the problem. The issuing of such command can be made conditional on a measurement of outside air temperature. The flow of additional outside air may be limited or avoided altogether where drawing in additional outside air would adversely affect the inside air temperature. Additional air can be drawn into a building, for example, by opening an economizer, activating a fan system, or by increasing a pressure setpoint in a supply air duct.

8 Claims, 6 Drawing Sheets

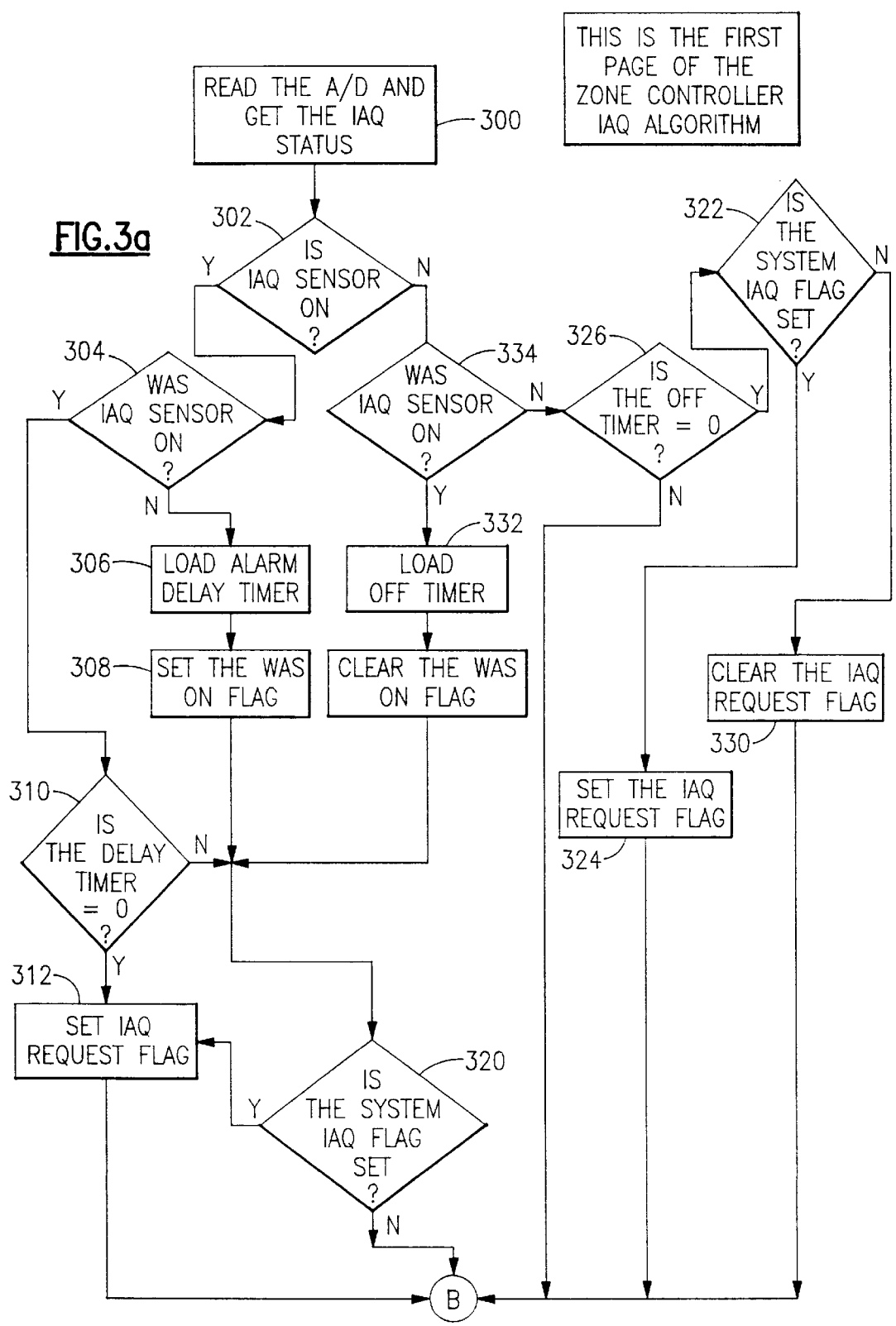

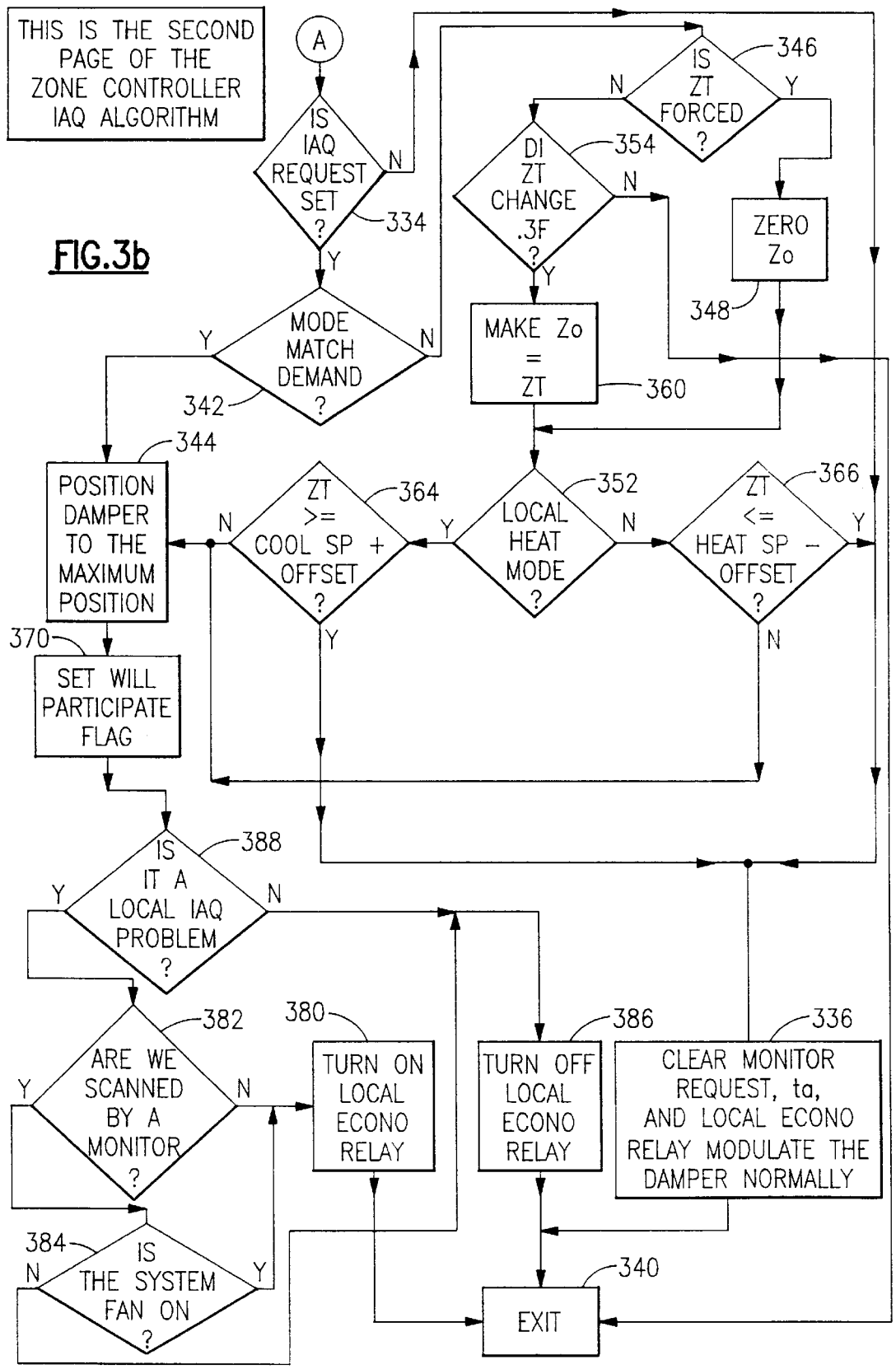

AIR QUALITY CONTROL SYSTEM

BACKGROUND OF THE INVENTION

1. Field of the Invention

The present invention relates to building climate control systems in general, and particularly to a building climate control system adapted to control air quality.

2. Background of the Prior Art

In a typical climate control system of a building, a central thermostat controls the temperature of air in the building. A building's central heating/cooling unit forces hot air or cool air to various points in a building through a ductwork comprising a supply air duct, a plurality of zone ducts, and a return air duct.

In many climate control systems, equal amounts of air are forced into each zone of a building through each zone duct. This type of system sometimes leads to temperature imbalances in a building, for example, in the case where intense sunlight shines for extended periods of time on one side of a building.

In one modern climate control system, temperature is controlled on a zone by zone basis. The amount of air that is forced through a given zone duct depends on the temperature, demand of the zone, and the overall temperature demand of the system.

While currently available building climate control systems regulate temperature in a building, and sometimes regulate temperature on a zone by zone basis, they generally do not take into account air quality. Air quality shall herein refer to any measurable non-temperature characteristic of air in a building having a determinable satisfactory range of levels or concentrations, and a determinable non-satisfactory range of levels or concentrations. Air quality can be measured in terms of carbon dioxide concentration. When a room in a building becomes heavily populated, the room's air quality declines as evidenced by an increase in the air's carbon dioxide concentration.

There exists a need for building a climate control system which can control the quality of air in a building.

SUMMARY OF THE INVENTION

According to its major aspects and broadly stated, the present invention is a system for controlling the quality of air in a building. The system includes at least one sensor disposed for sensing the air quality in a building. Upon the sensing of an air quality problem, the system issues a command to draw in additional outside air into the building to alleviate the problem. The issuing of such command can be made conditional on a measurement of outside air temperature. The flow of additional outside air may be limited or avoided altogether where drawing in additional outside air, according to a predetermined criteria, would adversely affect the inside air temperature.

A basic climate control system of a building typically includes a heating/cooling unit, a supply air duct extending from the heating/cooling unit, a plurality of zone ducts extending from the supply air duct to various zones in the building, and a return air duct extending from a return air space to the heating/cooling unit. An inlet air duct provides fluid communication between the heating/cooling unit and the building exterior. When a fan system in the heating/cooling unit is activated, air is drawn into the unit through the inlet duct and through the return air duct. In the basic system, a single thermostat is provided for controlling the temperature in the building.

An "economizer" controls the flow of air through the inlet air duct and the return air duct. The economizer includes an inlet damper member disposed in the inlet duct, and a return damper member disposed in the return air duct. The damper members have a predetermined position relative to one another so that the percentage of incoming air drawn in through the inlet duct and the return air duct, respectively, can be adjusted by adjusting the economizer position. During normal operation, the economizer regularly opens to a normal open position wherein a small percent of the unit's total air flow enters the heating/cooling unit through the inlet air duct, and a much larger percent enters through the return air duct. In most buildings, about 10 to 15 percent of the unit's air capacity enters through the inlet duct and about 85 to 90 percent enters through the return air duct when the economizer is in a normal open position. In many buildings, when the system demands cool air and the temperature of the outside air is cool, the economizer is opened to a more open position to allow a higher percentage of flow through the inlet duct. In the present invention, the economizer is used, in addition, to alleviate air quality problems. Under certain circumstances, an air quality problem may be addressed by opening the economizer to a wide open position (which may be a maximum open position) so that most or all of the unit's total incoming air enters the heating/cooling unit through the inlet air duct.

So that air quality problems may be sensed, at least one air quality sensor is disposed in the building for indicating the quality of air in the building. When an air quality sensor is disposed in a return air duct extending from a heating/cooling unit, then the air quality sensor senses the overall air quality in a building.

The output of the air quality sensor is input into a main controller, and the main controller is configured to control the economizer and the fan system. When the air quality sensor senses that air quality in the building has fallen below a predetermined level, then the system issues a command to draw additional outside air into the building to alleviate the air quality problem. Additional air can be drawn into the building by activating the fan system, (if not already operating) or the economizer, or both the fan system and the economizer in combination.

The command to increase the flow of outside air into the building may be made conditional on the detection of the temperature of the outside air. In one embodiment of the invention, the output from an outside air thermistor is input into the controller along with outputs from the thermostat indicating the heat and cool thermostat setpoints. Meanwhile, the controller is configured to limit or avoid drawing additional air into the building if the outside air temperature is outside a lockout range of temperatures determined by the thermostat's heat and cool setpoints (alternatively, the lockout range of temperatures may be fixed). In this way, the drawing in of additional outside air is limited or avoided, despite detection of an air quality problem, in the case where drawing additional outside air into the building would adversely affect inside air temperature. The system thereby balances the objective of air quality with the objective of air comfort.

The present air quality control system may include additional features when it is implemented in the building having a more sophisticated climate control system.

In a building having "smart" climate control, the desired temperature in the building is controlled on a zone by zone basis. In one type of smart temperature control system, a zone damper is installed in each zone duct and each zone damper is controlled by a zone thermostat controller. The thermostat controller of each zone includes a heat setpoint and a cool setpoint. If the temperature in the zone (indicated by a zone thermistor output presented to the zone controller) is below the heat setpoint, then the controller makes a demand for heat. If the zone temperature is above the cool set point, then the zone controller makes a demand for cool air.

A monitor controller is provided for periodically monitoring the zone thermostat controllers. At predetermined intervals, the monitor controller polls the zone thermostat controller, via a system bus, to determine the current demand of each zone, and therefrom, determines the overall system demand. Based on the overall system demand, the monitor controller instructs the heating/cooling unit to provide hot air, cool air, or to remain idle.

A zone controller will open its associated zone damper to a position determined by the zone heat or cool setpoint if the zone demand and the system demand coincide. If a zone's request does not match the system demand, or if zone's request and the system demand are both idle, then that zone's damper may be closed.

In the smart climate control system described, as well as in many basic climate control systems, a bypass duct provides fluid communication between the supply air duct and the building's return air space. A bypass damper is disposed in the bypass duct for controlling the amount of pressure in the supply air duct, and therefore, the flow rate of air that flows through the supply air duct. A bypass controller receives an input signal from a pressure sensor disposed in communication with the supply air duct, and modulates the bypass damper based on the pressure sensor input signal so as to maintain a constant air pressure in the supply duct in accordance with a pressure setpoint.

In the smart system implementation, additional outside air can be drawn into a building by activating the fan system, or by opening an economizer as in the basic system embodiment. In addition to these methods, additional outside air can be drawn in by increasing the pressure setpoint of the supply air duct.

In a typical implementation of the present invention in a smart climate control system, a zone air quality sensor is installed in at least one zone for sensing air quality in a zone, and a system air quality sensor is installed in the return air duct for sensing the overall air quality in a building.

When the present invention includes a zone air quality sensor and a system air quality sensor then the system is made responsive to an indication by either of the sensors that there is an air quality problem.

If the zone air quality sensor indicates an air quality problem, then the zone controller will first determine if the zone will participate in an air quality improvement routine. In general, a zone will participate in an air quality improvement routine if the zone damper can be open without causing a change determined in zone temperature in excess of a tolerable change, as determined by a predetermined criteria. If the zone damper can be open, the zone controller will open the zone damper to a maximum open position and will communicate to the monitor controller through the system bus that the zone will participate in the air quality improvement routine.

If the system air quality sensor indicates a problem with the overall air quality in the building, then each zone controller evaluates, as described above, whether its zone will participate in a routine for improving air quality.

In response to a communication from any one zone controller that a zone will participate in a routine for improving air quality, the monitor controller generates commands to cause an increase in the amount of outside air flowing into the building. The monitor may cause the system to perform any combination of at least three operations: The monitor may instruct the bypass controller to increase the pressure setpoint of the supply air duct, may instruct the fan assembly to turn on, or may instruct the economizer to open to a maximum open position. In a typical sequence of operation, the pressure level of the supply air duct is increased, the fan assembly is activated, and then the economizer is opened to a maximum open position.

As in the basic system implementation, the command to cause an increase in the outside air entering the building can be made conditional upon detection of the outside air temperature. The flow of additional outside air into the building can be limited or avoided altogether where the flow of additional outside air will adversely affect inside air temperature.

BRIEF DESCRIPTION OF THE DRAWINGS

In the Drawings,

FIGS. 3a-3b comprise a flow diagram illustrating operation of a smart system zone controller configured according to the invention;

DETAILED DESCRIPTION OF THE PREFERRED EMBODIMENTS

Figure 1:
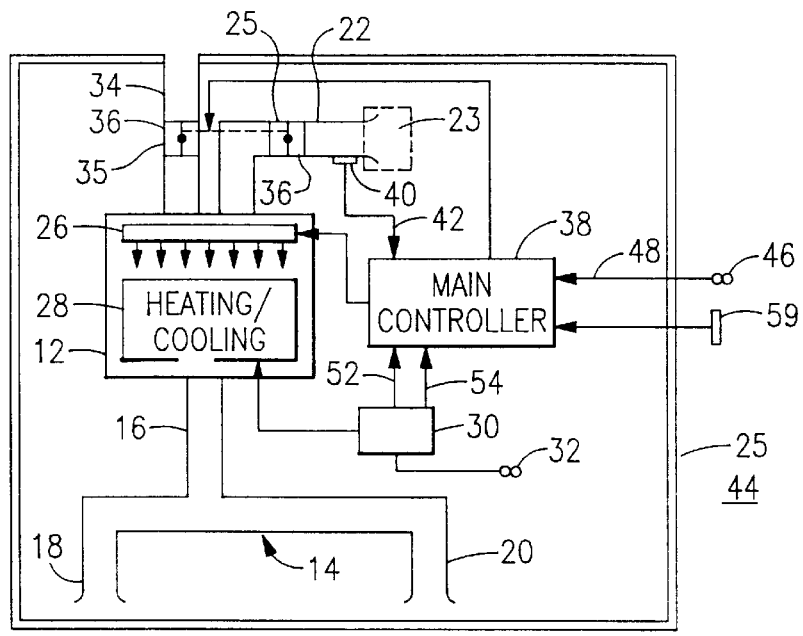
FIG. 1 is a functional diagram of the present invention as implemented into a building having a basic climate control system.

For illustration of its most fundamental features, the present invention is first shown as implemented in a basic building climate control system. Basic building climate control system 10 includes heating/cooling unit 12 which may be a dedicated heating unit or a dedicated cooling unit and a ductwork 14 comprising a supply duct 16 and at least one but normally a plurality of zone ducts 18, 20. In addition, return air duct 22 provides fluid communication between heating/cooling unit 12 and the building's return air space 23. Inlet air duct 34 is in fluid communication with heating/cooling unit 12 and with building exterior 44. When fan assembly 26 is activated, air is drawn into heating/cooling unit 12 from exterior 44 and from return air space 23.

An "economizer" controls the flow of air through inlet duct 34 and return air duct 22. Economizer 36 includes an inlet damper member 35 disposed in the inlet duct, and a return damper member 25 disposed in the return air duct. The damper members have a predetermined position relative to one another so that the percentage of incoming air drawn in through inlet duct 34 and the return air duct 22, respectively, can be adjusted by adjusting the economizer position. During normal operation, economizer 36 regularly opens to a normal open position wherein a small percent of the unit's total air flow enters heating/cooling unit 12 through inlet air duct 34, and a much larger percent enters through the return air duct. In most buildings, about 10 to 15 percent of the unit's air capacity enters through the inlet duct and about 85 to 95 percent enters through the return air duct when the economizer is in a normal open position. In many buildings, when the system demands cool air and the temperature of the outside air is cool, the economizer is opened to a more open position to allow a higher percentage of air flow through the inlet duct. In the present invention, the economizer is used, in addition, to alleviate air quality problems. Under certain circumstances, an air quality problem may be addressed, by opening the economizer to a wide open position (which may be a maximum open position) so that most or all of the unit's total air flow enters the heating/cooling unit through the inlet air duct. A "wide open" position shall herein refer to any economizer position wherein between about 15 to about 100 percent of incoming air enters heating/cooling unit 12 through inlet air duct 34. When the economizer is in a maximum open position then substantially all (100 percent) of incoming air enters through inlet air duct 34. Economizer 36 may be a guillotine-type economizer.

Temperature in the system shown in FIG. 1 is controlled by a single thermostat 30. A thermistor 32 positioned at one location in building 25 produces an output which is considered the building's temperature and is input into thermostat 30. Several thermistors can be provided whose outputs are averaged and considered to be the building's temperature. Thermostat 30, which produces control signals for controlling heating/cooling unit 12 typically has a heat set point and cool set point. If the building's temperature falls below the heat set point of the thermostat, then the thermostat makes a call for heat to heating/cooling unit 12. If the building's temperature increases above the cool set point then thermostat 30 makes a call for cool air to heating/cooling unit 12. If the building's temperature is between the heat and cool setpoints then no demand is made to heating/cooling unit 12 and heating/cooling unit is idle.

Main controller 38 is provided for controlling economizer 36. In addition, main controller 38 can be made to activate fan assembly 26 so that on demand, fan assembly 26 draws in an additional amount of outside air, if the fan assembly is not presently operating. Main controller 38 and other controllers discussed therein may be provided, for example, by a microprocessor system having a microprocessor, program and data storage components, and an analog-to-digital conversion unit for converting to digital form, signals received from system elements that may generate analog voltages such as thermistor 32.

Air quality in the present invention can be detected by any device which measures the presence or concentration of any unwanted substance or matter in the building or the level of any non-temperature air characteristic. For example, air quality sensor 40 may be a $CO_2$ sensor, a CO sensor, a Radon sensor, a humidity sensor, or a VOC sensor which senses the presence of several substances. An example of a $CO_2$ sensor which may be implemented is a model 2001 V-1C $CO_2$ sensor of the type manufactured by Telair Systems, Inc, of Goleta, Calif. Air quality sensors of this type have a sensing range of between 0 and 5000 ppm, and a factory setpoint of about 1000 ppm, which is adjustable through software. At $CO_2$ levels above the setpoint, the sensor emits an ON output signal. Telair 2001 V-1C air quality sensors are available in wall mount with LED, wall mount, and duct mount models.

In the embodiment of FIG. 1, air quality sensor 40 is disposed in return air duct 22. When an air quality sensor is disposed in return air duct 22, as shown in the embodiment of FIG. 1, air quality sensor 40 provides a measurement of the average or overall air quality in building. The present invention can include more than one air quality sensor. For example, air quality sensors can be installed in one or more zones of building 25 as well as in return air duct 22.

Air quality sensor 40 produces an ON output signal when the quality of air in building 25 has fallen below a predetermined level. The output from sensor 40 is presented to main controller 38, which causes additional air from building exterior 44 to flow into building 25 when the air quality sensor output indicates an air quality problem. The output from air quality sensor 40 may be considered to have indicated an air quality problem when the output turns ON or alternatively, remains ON for a predetermined period.

Controller 38 causes additional air to flow into building 25 by activating either fan assembly 26 or economizer 36 or both economizer 36 and fan assembly 26 in combination. In a preferred embodiment of the invention, controller 38 causes fan assembly 26 to turn on and economizer 36 to open to a maximum open position in response to receiving an output from air quality sensor 40 indicating that air quality in building has fallen below a predetermined level.

If the flow of air from building exterior 44 will cause temperature inside the building to increase or decrease substantially from a desired level, it may be desirable to avoid opening economizer and/or increasing the output of fan assembly 26 even if an air quality problem is sensed. Accordingly, a command presented by controller 38 to increase the amount of air drawn into building 25 from building exterior 44 may be made conditional upon a detection of the outside air temperature. The flow of additional outside air into building 25 may be limited or avoided altogether if the flow of additional air will adversely impact the temperature of air inside building 25.

To implement the above, an outdoor thermistor 46 is disposed at building exterior 44 for detecting the outside air temperature, and the output thereof 48 is input into controller 38. Outputs 52 and 54 from thermostat 30 indicating the heat and cool setpoints of thermostat, meanwhile, are also input into controller 38. To limit or avoid the flow of additional air controller 38 may not turn on fan assembly 26 and/or may not open economizer 36 to a maximum open position if the temperature of the outside air is outside a lockout temperature range determined by the thermostat heat and cool setpoints. Alternatively, the lockout temperature range may be fixed and independent of the thermostat setpoints.

The drawing in of additional outside air may also be limited or avoided altogether when an outside air quality problem is sensed. A measurement of outside air quality may be made, for example, by a humidity detector or an enthalpy switch. In FIG. 1, the output from humidity detector 59 disposed at exterior 44 is presented to controller 38 which is configured to limit or avoid the drawing in of additional outside air when humidity detector 59 indicates a humidity problem. A humidity problem may be indicated when the output of detector 59 exceeds or remains above a predetermined level. A typical setpoint for the humidity lockout function is 70 percent humidity.

Figure 2:
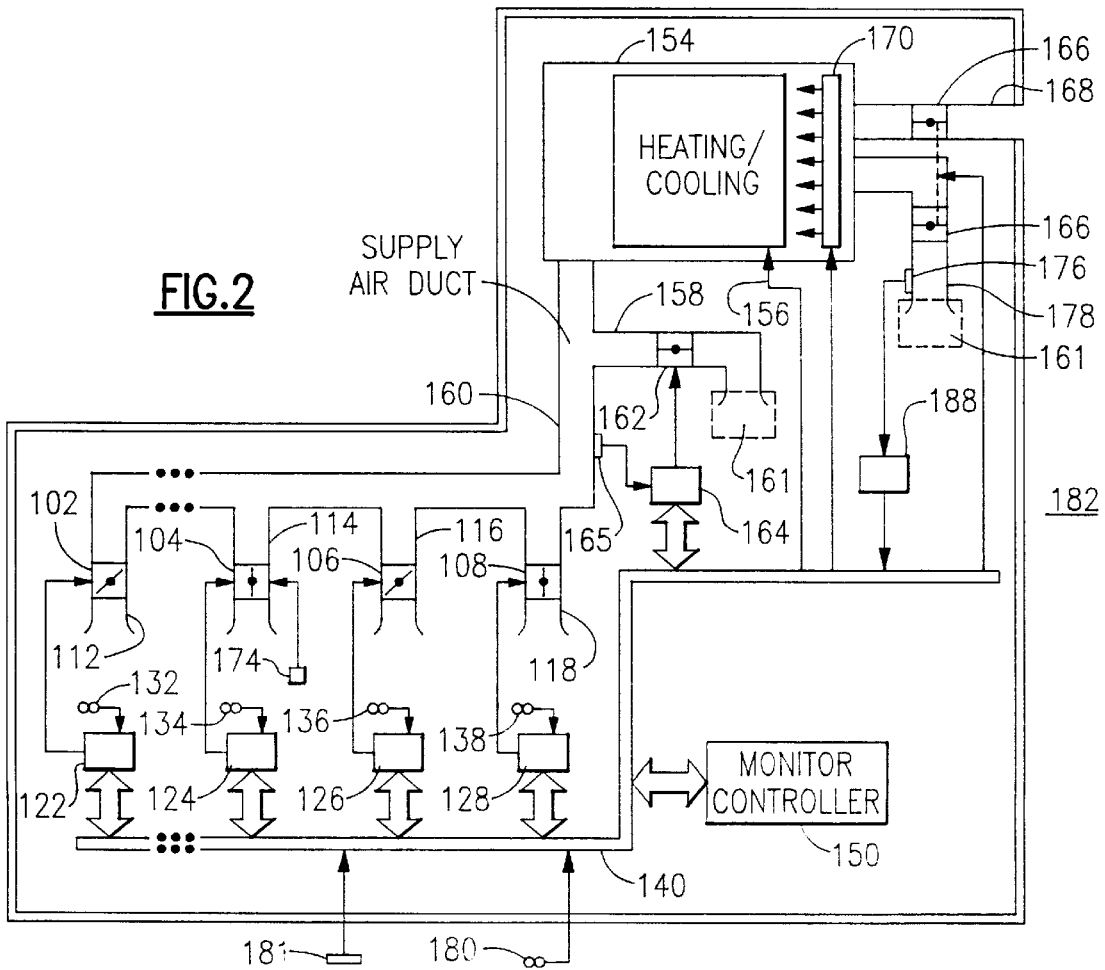
FIG. 2 is a functional diagram of the present invention as implemented in a building having a smart climate control system.

With reference now to FIG. 2, implementation of the present invention in a smart climate control system will be described in detail. An example of a smart climate control system is the Variable Volume/Variable Temperature (VVT) system available from Carrier Corporation of Syracuse N.Y.

In the smart climate control system of FIG. 2, a zone damper 102, 104, 106, 108 is installed in each zone duct 112, 114, 116, 118 and each zone damper is controlled by a zone thermostat controller 122, 124, 126, 128. The thermostat controller of each zone includes a heat setpoint and a cool setpoint, and the temperature of each zone is measured by a zone thermistor 132, 134, 136, 138. If a zone thermistor e.g. 134 indicates that the temperature in the zone is below the heat setpoint, then controller 124 for that zone makes a request for heat. If the zone temperature is above the cool setpoint, then the zone controller makes a request for cool air.

A monitor controller 150 is provided for periodically monitoring the zone thermostat controllers. At predetermined intervals, monitor controller 150 polls communication bus 140 to determine the temperature demand of each zone, and therefrom, determines the overall system demand. Based on the overall system demand, monitor controller 150 instructs heating/cooling unit 154 to provide hot air, cool air, or to remain idle.

Zone controller e.g. 124 will open its associated zone damper 104 if in doing so its zone demand will be met. The extent of opening of the damper depends on demand. If a zone's request does not match the system demand, or if the zone's request and the system demand are both idle, then that zone's damper may be closed.

In the smart temperature control system of FIG. 2, bypass duct 158 provides fluid communication between supply air duct 160 and the building's return air space 161. A bypass damper 162 is disposed in bypass duct 158 for controlling the amount of pressure in supply air duct 160, and therefore, the volume of air that flows through supply air duct 160. Bypass controller 164 modulates bypass damper 162 based on the output of pressure sensor 165 in fluid communication with supply air duct 160 so as to regulate and provide a consistent pressure in and therefore flow of air through supply air duct 160.

When the present invention is implemented in a smart climate control system, additional outside air can be drawn into a building by activating fan system 170 or by opening economizer 166 as in the basic system embodiment. In addition to these methods, additional outside air can also be drawn in by increasing the pressure setpoint in supply air duct 160 to increase the volume of outside air flowing through supply air duct 160.

In a typical implementation of the present invention in a smart climate control system, a zone air quality sensor 174 is installed in at least one zone 114 for sensing air quality in that zone and a system air quality sensor 176 is installed in return air duct 178 for sensing the overall air quality in a building.

When the present invention includes a zone air quality sensor 174 and a system air quality sensor 176 then the system is made responsive to an indication by either of the sensors that there is an air quality problem. An air quality problem can be indicated, for example, by the output of an air quality sensor falling below a predetermined level, or by the output of an air quality sensor remaining below a predetermined level for a predetermined period.

If zone air quality sensor 174 indicates an air quality problem, then zone controller 124 will first determine if the zone will participate in an air quality improvement routine. In general, a zone will participate in an air quality improvement routine if zone damper 104 can be open without causing a change in zone temperature in excess of a tolerable change according to a predetermined criteria. If zone damper 104 can be open to a maximum open position, zone controller 124 will open the zone damper to a maximum open position and will communicate to monitor controller 150 through system bus 140 that the zone will participate in the air quality improvement routine.

If system air quality sensor 176 indicates an air quality problem, then monitor 150 instructs each zone controller 122, 124, 126, 128 to evaluate whether its zone can participate in a routine for improving air quality according to the criteria described above. A zone will participate in an air quality improvement routine if its zone damper can be open to a maximum open position without, according to a predetermined criteria, causing a change in zone temperature exceeding a tolerable change.

In response to a communication from any one zone controller that a zone will participate in a routine for improving air quality. (Whether the indication of an air quality problem originates in a zone sensor or a system air quality sensor) monitor controller 150 generates commands to cause an increase in the amount of outside air flowing into the building. Monitor 150 may cause the system to perform any combination of at least three operations: Monitor 150 may instruct bypass controller 164 to increase the pressure rating of the supply air duct by modulating the bypass damper, or may instruct the fan assembly 170 to start up if it is presently shut down or may instruct economizer 166 to open to a wide open or a maximum open position. In a typical sequence of operation, the pressure level of the supply air duct is increased, fan assembly 170 is turned on, and economizer 166 is opened to a maximum open position. These three methods are in addition to each participating zone controller opening its associated zone damper to a maximum open position upon an indication of an air quality problem.

As in the basic system implementation, the flow of outside air entering the building can be limited or avoided upon detection of the outside air temperature by outside thermistor 180, disposed at building's exterior 182 so that an increase the flow of outside air into the building does not cause a change in zone temperature exceeding a predetermined tolerable amount. The flow of additional outside air can also be limited or avoided if an air quality sensor such as a humidity detector 181 indicates that the quality of outside air is low.

General features of a smart system implementation of the present invention have been described. Now, with reference to flow diagrams 3a through 6, description of more specific features of the invention according to a preferred implementation in a smart climate control system will be made.

Flow diagrams 3a and 3b describe operation of the a zone controller programmed in accordance with the invention. At step 300 zone controller, e.g. 124 reads the IAQ status from zone Indoor Air Quality (IAQ) sensor 174, and at step 302 determines if the zone IAQ sensor is ON. The zone IAQ sensor will be ON if the air quality in the zone falls below a predetermined satisfactory level. If the IAQ sensor is ON, zone controller 124 at step 304 determines if sensor 174 was previously on. If the sensor was not previously on, controller 124 sets a delay timer at step 306 and raises a WAS ON flag at step 308. When controller 124 again executes step 304 to determine if the sensor was previously on, controller will proceed to step 310 which determines if the delay timer has elapsed. If the delay timer has elapsed, then the IAQ REQUEST flag is raised at step 312. It is seen that, as a result of steps 306 and 310, the IAQ sensor must be on for at least the duration of the delay timer before activation of a local IAQ sensor results in the IAQ REQUEST flag being raised. The relay timer should be set to a timer sufficient so that the routine for drawing in additional air is not actuated by a short-lived, concentration, or otherwise insignificant air quality problem. A typical setting for the relay timer is 2 minutes.

The IAQ REQUEST flag can also be raised by a making of the system IAQ sensor 176. As will be discussed in connection with FIG. 4, the making of system IAQ sensor 176 for a predetermined period of time will result in a SYSTEM IAQ sensor being raised. Steps 320 and 322 determine if the SYSTEM IAQ flag is raised and set the IAQ REQUEST flag on at steps 312 and 324 respectively if the flag is raised. Step 324 is executed whenever the zone IAQ sensor is on and before the delay timer reaches zero. Step 322 is executed generally whenever the zone IAQ sensor is not on, if controller 124 in step 326 determine that the OFF timer has expired.

It will be seen that OFF timer serves to lock on the IAQ REQUEST flag after the zone IAQ sensor switches from an ON state to an OFF state. Once it has been raised, the IAQ REQUEST flag is cleared upon activation of step 330, which is executed only after the OFF timer expires. The OFF timer is set at step 332 after controller 124 in step 334 determines that system IAQ sensor 174 has changed from an ON to an OFF state. Thus, once an IAQ REQUEST flag is raised (which requires that the IAQ sensor be on for a predetermined length of time) the flag will not be lowered until a predetermined time after the system IAQ sensor changes from on to off. This feature helps assure that the building will be adequately purged with fresh air after an air quality problem is sensed. A typical setting for the OFF timer is 5 minutes.

In step 334 zone controller 124 determines if the IAQ REQUEST flag has been raised. If the flag has not been raised, then program control proceeds directly to step 336 to reset or clear various program control parameters and then exits to the main zone control program at step 340. If the IAQ REQUEST flag has been raised, then zone controller 124 executes a series of steps to determine if its zone can participate in an air quality improvement routine. A zone will participate in an air quality improvement routine if its zone damper can be opened to a maximum open position without, according to a predetermined criteria, resulting in a zone temperature in excess of a predetermined tolerable change.

Now describing specifics of a criteria for determining if opening zone damper 104 will result in a zone temperature change in excess of a tolerable change, zone controller 124 determines at step 342 if the temperature demand of the zone and the temperature demand of the system coincide. If the temperature demand of the zone and the temperature demand of the system match then zone damper 104 can be opened to a maximum open position without causing a temperature change in excess of a tolerable change. Therefore, if the zone demand and system demand match, then controller 124 executes step 344 to open zone damper 104 to a maximum open position.

If the zone demand and the monitor demand do not match, then a series of steps are executed to determine if the zone damper can be open to a maximum open position despite the mismatch. A zone damper can be open to a maximum open position despite a demand mismatch if the zone temperature is within a range of temperatures determined by the zone thermostat setpoints offset by an offset temperature. The offset temperatures will typically be in the range of from about 0 to 10 degrees. Thus, controller 124 will instruct damper 104 to open to a full open position if the current zone temperature is proximate (within about 0 to 10 degrees) either the heat setpoint or the cool setpoint. If the current temperature is proximate either the heat or cool setpoints, it is determined that opening the damper to a maximum open position will not cause a temperature change in excess of a tolerable temperature change, and damper 104 is instructed to open to a maximum open position.

Now referring specifically to the flow diagram of FIG. 3b, controller 124 determines at step 346 whether the zone temperature is "forced", i.e. whether the zone temperature is an actual temperature determined by thermistor 134 or whether the zone temperature is a test number programmed in software. If the zone temperature is forced, controller 124 at step 348 clears (sets to 0) the present value for $Z_T$, and executes step 352. If the zone temperature is an actual temperature, then controller 124 determines at step 354 if the zone temperature has changed a predetermined number of degrees, for example 0.3 degrees, from a previous zone temperature, $Z_o$, which is initially set to zero. When step 354 is initially executed, the difference between $Z_T$ and $Z_o$ will be greater than 0.3 degrees and step 352 will be executed after $Z_o$ is set to $Z_T$ in step 360. If the difference between $Z_T$ and $Z_o$ is less than 0.3 degrees then step 340 will be executed to exit to the main zone control program without clearing $Z_o$ at step 336. The difference between $Z_T$ and $Z_o$ will always be less than 0.3 degrees immediately after $Z_o$ is set to $Z_T$ in step 360, step 352 will not be executed again until the zone temperature changes 0.3 degrees unless the zone temperature is outside the offset range of temperature (see steps 364 and 366) in which case $Z_o$ is set to zero at step 336. It will be seen that step 354, requiring a predetermined temperature change before a branch condition is met, prevents repeated execution of step 344, and therefore guards against repeated opening and closing of zone damper 104. Without step 354, zone damper 104 could be made to continuously open and close in the case, for example, where the zone temperature is approximately at the boundary of an offset setpoint, and the hysteresis of the temperature sensor results in temperature measurements that fluctuate between measurements above and measurements below the offset setpoint.

Now referring specifically to steps 352, 364, and 366, controller 124 determines if the zone demand is for heat in step 352. If the zone is demanding heat (meaning the system's demand is cool or idle) then controller 124 determines at step 354 if $Z_T$, zone temperature, is within the zone cool setpoint plus a predetermined offset. If the zone temperature is less than the offset cool setpoint, then damper 104 is opened to a maximum open position at step 344. If in step 352 controller 124 determines that the zone demand is either idle or for low heat, then controller 124 at step 366 determines whether the zone temperature is above the heat setpoint minus an offset and opens the damper to a maximum open position at step 344 if the zone temperature is above the offset heat setpoint. If controller 124 determines that the zone temperature is outside the temperature range defined by the offset hot setpoint and offset cool setpoint, then damper 104 is not opened and step 336 is executed to clear the monitor request, the previous value for zone temperature, and the local economizer relay controlling the zone exhaust fan.

If the damper is opened to a maximum position at step 344, then a series of additional steps are performed. If the dampers can be opened to a maximum open position, then the zone is deemed able to participate in an air quality improvement routine. Accordingly, a WILL PARTICIPATE flag is set and presented to system bus 140 at step 370 for reading by monitor controller 150.

Further, it will generally be desirable to activate a zone exhaust fan when a decline of zone air quality results in a zone damper being opened to a maximum open position. A zone exhaust fan (not shown) forces air through a zone exhaust duct (not shown) in fluid communication with a zone and exterior 182. Thus, activation of a zone exhaust fan results in a low quality air being removed from the zone. It is seen, referring to FIG. 3*b*, that the local exhaust fan is turned on in response to a local IAQ problem at step 380 either if there is no active monitor controller 150 (determined at step 382) or if there is a monitor controller and system fan 384 is turned on. The local exhaust fan is turned off at step 386 either if the problem is not a zone IAQ problem determined at step 388 or if the system fan is not open.

Figure 4:
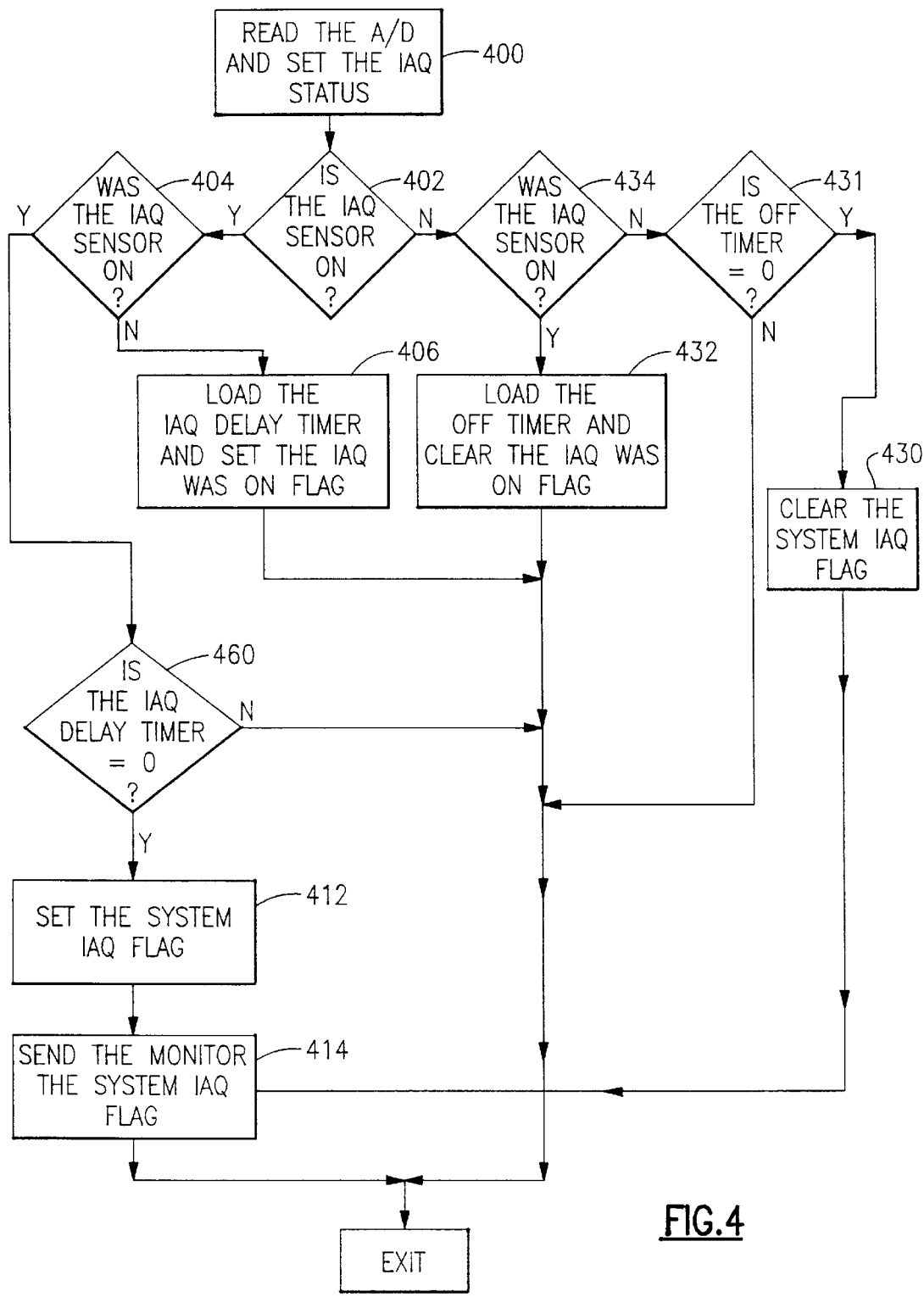
FIG. 4 is a flow diagram illustrating operation of a smart system air quality sensor controller as configured according to the invention.

The flow diagram of FIG. 4 illustrates operation of system sensor controller 188 which processes signals from system IAQ sensor 176, and presents a SYSTEM IAQ flag to system bus 140 under certain predetermined conditions. While controller 188 is shown in FIG. 2 as an independent element, it is convenient to adapt bypass controller 164 to receive the system IAQ sensor output, and carry out the function of system sensor controller 188.

The conditions required for the raising of the SYSTEM IAQ flag are similar to those for raising of a IAQ REQUEST flag by a zone controller. At step 400 system sensor controller 188 reads the IAQ status from system IAQ sensor 176, and at step 402 determines if the system IAQ sensor is on. The IAQ sensor will be on if the if the air quality in the return air duct falls below a predetermined satisfactory level. If the system IAQ sensor is on, system controller 188 at step 404 determines if sensor 176 was previously on. If the sensor was not previously on, controller 188 sets a delay timer and raises a WAS ON flag at step 406. When controller 188 again executes step 404 to determine if the sensor was previously on, (assuming no intervening shut off of sensor 176) control will proceed to step 410 which determines if the delay timer has elapsed. If the delay timer has elapsed, then the SYSTEM IAQ flag is raised at step 412, for presentation to system bus 140 at step 414. It is seen that, as a result of steps 406 and 410, the IAQ sensor must be on for at least the duration of the delay timer before activation of a system IAQ sensor results in a SYSTEM IAQ flag being raised. As in the case of the zone IAQ sensor, a typical setting for delay timer will be about 2 minutes.

Once it has been raised, the SYSTEM IAQ flag is cleared upon activation of step 430, which is executed only after the OFF timer expires(step 431), having a typical setting of about 5 minutes. The off timer is set at step 432 after controller 188 in step 434 determines that system IAQ sensor 176 has changed from an ON to an OFF state. Thus, once a SYSTEM IAQ flag is raised, which requires that the IAQ sensor be on for a predetermined length of time, the flag will not be lowered until a predetermined time after the system IAQ sensor changes from on to off. This feature helps assure that the building will be adequately purged with fresh air after a system air quality problem is sensed.

Figure 5:
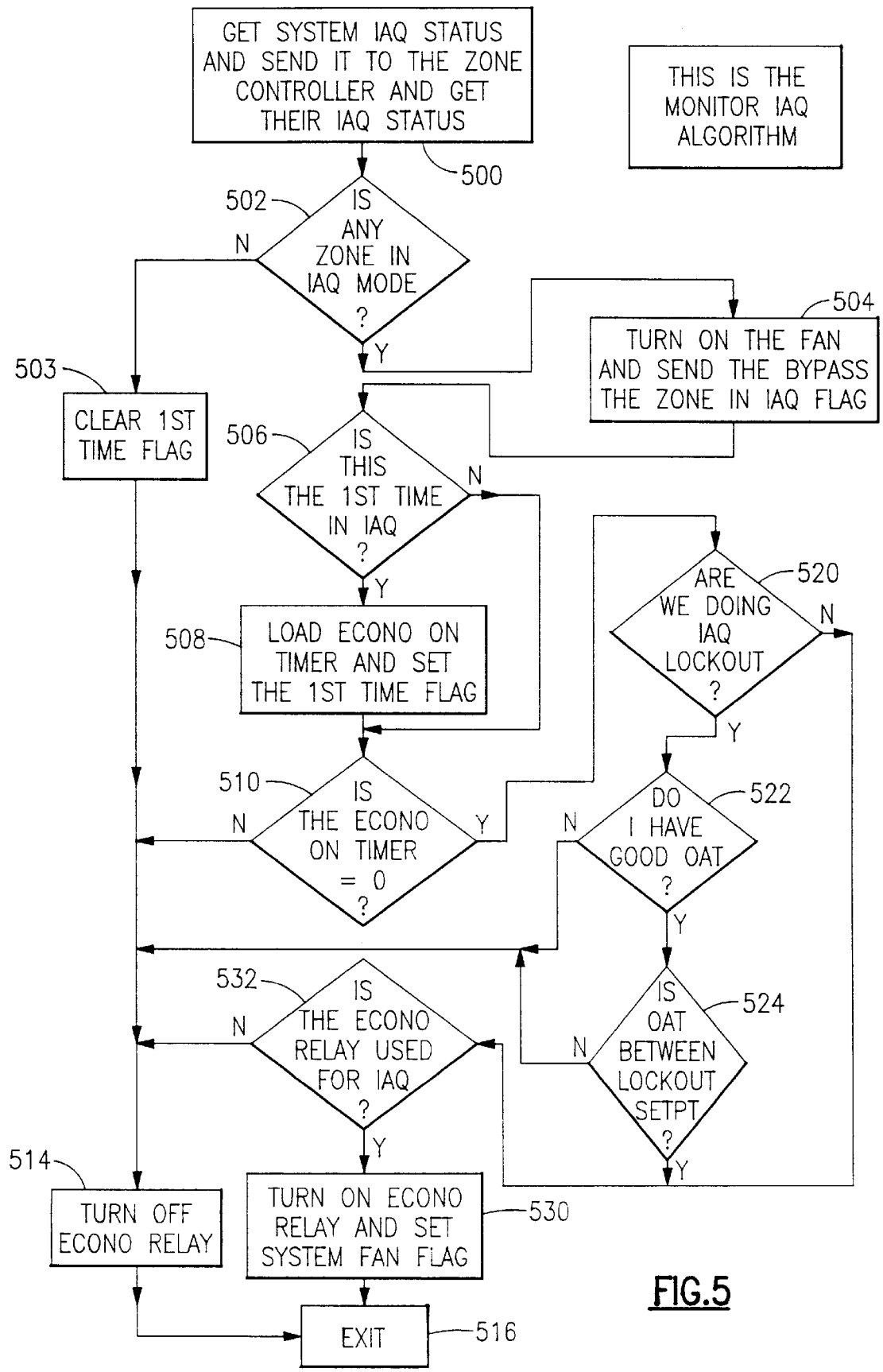
FIG. 5 is a flow diagram illustrating operation of a smart system monitor controller as configured according to the invention.

Now referring to FIG. 5, operation of monitor controller 150 in one embodiment of the invention will be described in detail. In general, monitor controller reads system bus 140 periodically at predetermined intervals. Typically, controller 150 scans system bus 140 once every 10 to about 120 seconds, and most preferably, once every 20 to about 25 seconds. The read rate is normally limited by the baud rate of system bus 140. The primary function of monitor controller 150 in a prior art climate control system is to read the system bus to determine the temperature demand of each zone, and therefrom, calculate an overall system temperature demand based on predetermined criteria. When the present invention is implemented, monitor controller 150 is made, in addition, to activate various components for causing an increased flow of fresh air into the building, in response to an indication from any zone that at least one zone can participate in an air quality improvement routine.

In step 500 monitor controller 150 reads system bus 140 to determine the IAQ status from the zone controllers. After reading the IAQ status from each zone, monitor controller 150 at step 502 determines if any zone is in the IAQ mode, i.e. whether any zone has moved its damper to a full open position, as indicated by the raising of a WILL PARTICIPATE flag. If no zone is in an IAQ mode then controller 150 clears a FIRST TIME flag at step 503, then generates a control signal to move the economizer from a maximum position at step 514, before exiting to the main monitor control program at step 516. If any one zone has a WILL PARTICIPATE flag raised, then monitor controller 150 generates certain commands to cause an increase in flow of fresh air into the building.

Specifically, in step 504 monitor controller 150 generates a control signal for turning on system fan assembly 120 which may previously be operating according to normal operation. Further to the end that the volume of fresh air is increased, monitor controller 150 presents a flag to system bus 140 instructing bypass controller 164 to increase the pressure setpoint of supply air duct 160.

Monitor controller 150 then determines, at step 506 whether the present indication that at least one zone can participate in IAQ is the first such indication. If it is the first indication, an economizer timer is set at step 508. Opening of economizer 166 or economizer is delayed a predetermined time (determined by the economizer timer duration) after an indication from a zone that a zone can participate in an air quality improvement routine. The reason for this delay is that air quality problems can often be resolved by turning on the system fan and/or increasing the supply air duct pressure without opening the economizer to a wide open maximum position. A typical setting for the economizer timer is about 10 minutes.

It is seen, however, that if fan assembly 26 has previously been operating longer than the damper timer setting, then economizer 166 may be open in step 530 immediately upon a reception by monitor controller 150 of an IAQ REQUEST flag.

In step 510 controller 150 determines if the economizer timer has expired. If the timer is not off, then controller 150 sends a shut off signal to the economizer relay at step 514 before exiting to the main monitor program.

If an air quality problem persists until the economizer timer expires, or is detected after expiration of the timer, then monitor controller 150 executes steps 520, 522, and 524 to determine if economizer 166 can be open to a maximum position. Generally, economizer 166 can be open to a maximum position if opening the damper to a maximum position will not bring about a temperature change in building in excess of a tolerable change, and will not adversely affect air quality, as determined by a predetermined criteria.

Monitor controller 150 determines at step 520 whether a lockout function is activated. If the lockout is not on, then controller 150 will open economizer 166 at step 530 whatever the outside air temperature and/or quality as long as the economizer is designated for use in an air quality improvement routine (determined at step 532).

If the lockout function is on, then controller 150 may be configured to determine at step 522 whether the quality of outside air is satisfactory. Outside air quality can be measured by humidity detector 181. A typical humidity level setpoint for humidity detector 181 is 70 percent humidity. Outside air quality can also be measured by, for example, an enthalpy switch. If the air quality is determined to be satisfactory, at step 522, then controller 150, at step 524 determines if the outside air temperature, as measured by outside thermistor 180, is between predetermined lower and upper lockout setpoints. The lockout setpoints may be dependent on, or independent of the system temperature demand. Typical fixed value lockout setpoints are 40 degrees F. (lower) and 85 degrees (upper) F. If the temperature of the outside air is within the lockout setpoints, then the economizer is instructed to open to a maximum open position at step 530 and a system EXHAUST FAN FLAG is raised, to be discussed in connection with FIG. 6. If the quality of the outside air is below a predetermined level (step 522) or if the temperature of the outside air is not within the lockout setpoints (step 524), then monitor controller 150 executes step 514 to generate a signal instructing the economizer to move from a maximum open position to resume normal operation.

Figure 6:
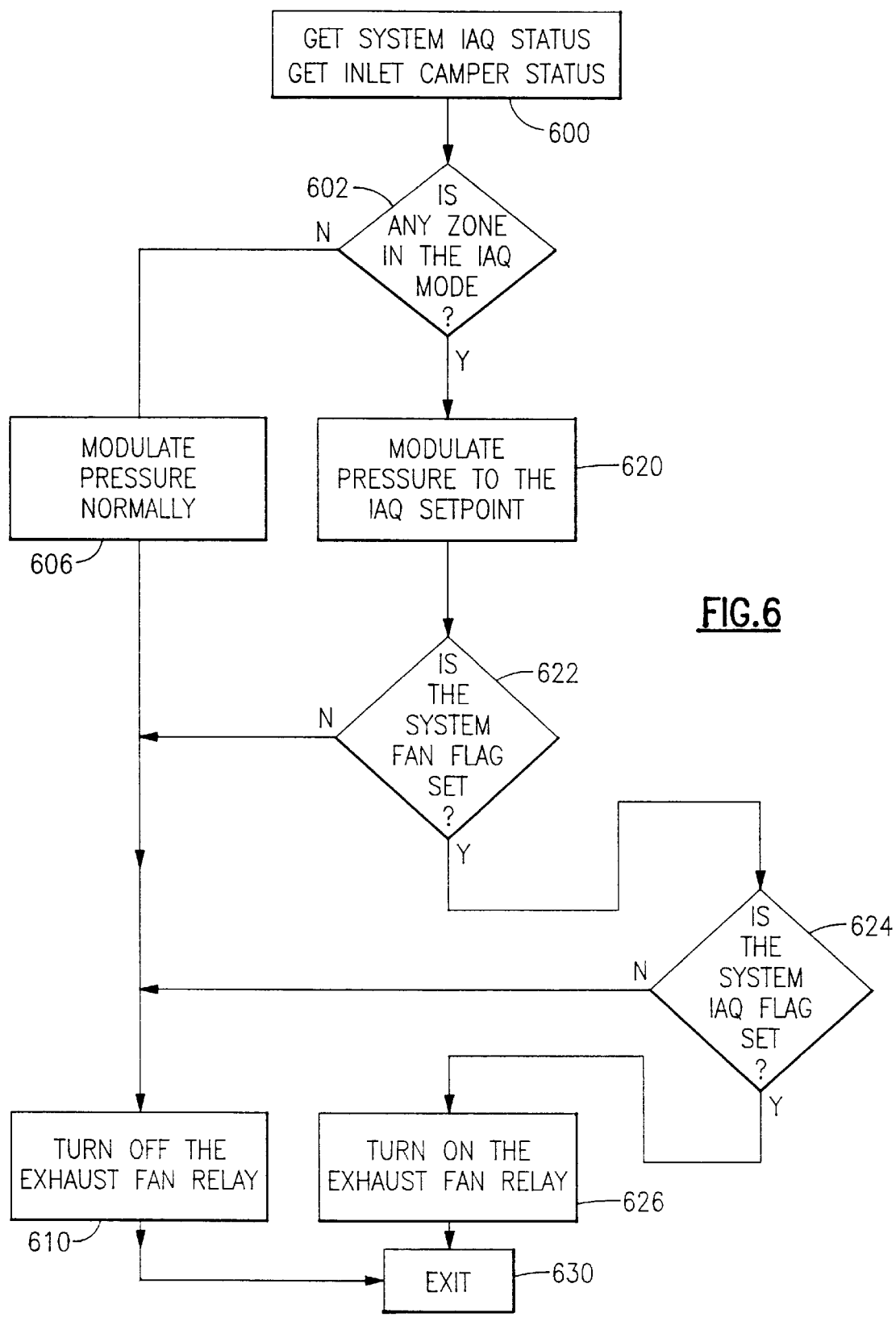
FIG. 6 is a flow diagram illustrating operation of the smart system bypass controller as configured according to the invention.

FIG. 6 is a flow diagram illustrating operation of bypass controller 164 adapted according to the invention to aid in increasing the flow of fresh air into a building under certain conditions.

In step 602 bypass controller 164 determines if any zone is in the IAQ mode, a condition which may be indicated by the monitor controller raising and presenting to bus 140 a ZONE IN flag (see step 504 of the monitor control flow diagram). If no zone can participate a routine for improving air quality, then bypass controller 164 generates an instruction at step 606 to modulate supply air duct pressure normally before executing step 610 to turn off the system exhaust fan relay if it is currently on. If at least one zone is in an IAQ mode (i.e. can participate in a routine for improving air quality, and has its zone damper set to a full open position), then bypass controller 164 generates a signal at step 620 to increase the pressure setpoint in supply air duct 160 so as to encourage the drawing in of additional outside air into the building.

In general, it will be desirable to activate a system exhaust fan when a system IAQ problem is serious enough to result in, the economizer being open to a maximum open position. It will normally not be desirable or necessary to activate the system exhaust fan in response to a relatively minor zone IAQ problem, or in response to a system IAQ problem not serious enough to result in or otherwise not warranting economizer 166 being open. The system exhaust fan (not shown) forces air through a system exhaust duct (not shown), which is in fluid communication between return air space duct 178 and exterior 182. Therefore, when the system exhaust fan is activated, low quality air is removed from a building's return air space 161. In step 622, bypass controller 164 determines if the EXHAUST FAN flag has been raised, and in step 624, bypass controller 164 determines if the SYSTEM IAQ flag has been raised. As seen with reference to FIG. 5, step 530, the EXHAUST FAN flag is raised when the economizer is open to a maximum position. The SYSTEM IAQ flag is raised at step 412 of FIG. 4 when a system air quality problem is sensed by system IAQ sensor 176. Therefore, it can be seen that the exhaust fan relay activating the system exhaust fan will be energized at step 626 only if there is a system IAQ problem warranting economizer 166 being open. Shown as being controlled by bypass controller 164, the system exhaust fan can also be controlled using another of the system's controllers, such as monitor controller 150 if it has enough available output ports.

While the present invention has been described with reference to a number of specific embodiments, it will be understood that the spirit and scope of the present invention should be determined with reference to the appended claims.

We claim:

1. A system for controlling air quality in a building, said building having an interior and an exterior, a heating and cooling unit, an economizer in fluid communication with said exterior and said interior for bringing in fresh air from the exterior to the interior, a supply air duct in fluid communication with said economizer, a return air space and a bypass duct in fluid communication with said supply air duct and said return air space said system comprising:

air quality sensing means disposed in said interior for sensing air quality in said interior, said sensing means generating an output signal;

flow increasing means for increasing a flow of air from said exterior to said interior, wherein said flow increasing means includes a bypass damper disposed in said bypass duct, said bypass damper being closable for increasing the flow of air through said supply air duct; and outside temperature sensing means, in communication with said control means, for sensing the temperature of outside air, said flow increasing means arranged to assume a first state and a second state, said second state resulting in a greater flow of air than said first state, wherein said control means establishes said second state when said air quality falls below a predetermined level for a predetermined duration if said outside air temperature is within a lockout range of temperatures.

2. A system for controlling air quality in a building, said building having an interior and an exterior, a heating and cooling unit, an economizer in fluid communication with said exterior and said interior for bringing in fresh air from the exterior to the interior, a supply air duct in fluid communication with said economizer, a return air space and a bypass duct in fluid communication with said supply air duct and said return air space said system comprising:

air quality sensing means disposed in said interior for sensing air quality in said interior, said sensing means generating an output signal;

flow increasing means for increasing a flow of air from said exterior to said interior, wherein said flow increasing means includes a bypass damper disposed in said bypass duct, said bypass damper being closable for increasing the flow of air through said supply air duct; and outside temperature sensing means, in communication with said control means, for sensing the temperature of outside air, said flow increasing means being arranged to assume a first state and a second state, said second state resulting in a greater flow of air than said first state, wherein said control means establishes said first state when said air quality falls below a predetermined level for a predetermined duration if said outside air temperature is not within a lockout range of temperatures.

3. A method for improving air quality in a building, said building having an interior and an exterior, and a climate control system comprising an inlet air duct providing fluid communication between said exterior and said interior, a fan assembly disposed proximate an inlet end of said inlet duct, a bypass duct, a supply air duct, a return air duct, and a plurality of zone ducts for distributing air to each of several zones of said building, each zone duct having a zone damper, said method comprising:

monitoring a zone air quality sensor disposed in one of said zones;

monitoring a system air quality sensor disposed in said return air duct;

upon detection of an air quality problem by either of said sensors evaluating whether at least one of said dampers can be open to a full open position, without, according to a predetermined criteria, adversely affecting air temperature in said at least one zone; and if at least one zone damper can be open to a full open position increasing a flow of outside air into said building.

4. The method of claim 3, wherein said flow increasing step includes the step of:

activating said fan assembly.

5. The method of claim 3, wherein said flow increasing step includes the step of:

increasing the pressure setpoint in said supply air duct.

6. The method of claim 3, wherein said flow increasing step includes the step of:

opening an economizer partially disposed in said inlet duct to a wide open position.

7. The method of claim 3, said method further comprising the steps of:

measuring outside air temperature to decide, according to a predetermined criteria, whether increasing flow of outside air will adversely affect inside air temperature;

in said flow increasing step, upon deciding that inside air temperature will be adversely affected activating said fan assembly; and increasing the pressure setpoint in said supply air duct.

8. The method of claim 3, said method further comprising the steps of:

measuring outside air temperature to decide, according to a predetermined criteria, whether increasing flow of outside air will adversely affect inside air temperature;

in said flow increasing step, upon deciding that inside air temperature will not be adversely affected activating said fan assembly;

increasing the pressure setpoint in said supply air duct; and opening said economizer.

\* \* \* \* \*